US011557215B2

(12) United States Patent
Rubinstein et al.

(10) Patent No.: US 11,557,215 B2
(45) Date of Patent: Jan. 17, 2023

(54) CLASSIFICATION OF MUSCULOSKELETAL FORM USING MACHINE LEARNING MODEL

(71) Applicant: Physera, Inc., Menlo Park, CA (US)

(72) Inventors: Yigal Dan Rubinstein, Los Altos, CA (US); Cameron Marlow, Menlo Park, CA (US); Todd Riley Norwood, Redwood City, CA (US); Jonathan Chang, San Francisco, CA (US); Shane Patrick Ahern, Belmont, CA (US); Daniel Matthew Merl, Livermore, CA (US)

(73) Assignee: Physera, Inc., Menlo Park, CA (US)

( * ) Notice: Subject to any disclaimer, the term of this patent is extended or adjusted under 35 U.S.C. 154(b) by 593 days.

(21) Appl. No.: 16/057,715

(22) Filed: Aug. 7, 2018

(65) Prior Publication Data

US 2020/0051446 A1    Feb. 13, 2020

(51) Int. Cl.
*G09B 5/02* (2006.01)
*G09B 5/14* (2006.01)
*G06N 20/00* (2019.01)
*G09B 19/00* (2006.01)

(52) U.S. Cl.
CPC .............. *G09B 5/02* (2013.01); *G06N 20/00* (2019.01); *G09B 5/14* (2013.01); *G09B 19/0038* (2013.01); *G09G 2340/12* (2013.01)

(58) Field of Classification Search
CPC ...................................................... G09B 5/02
See application file for complete search history.

(56) References Cited

U.S. PATENT DOCUMENTS

| | | | | |
|---|---|---|---|---|
| 9,589,207 | B2 * | 3/2017 | Holohan | G06T 7/75 |
| 9,656,119 | B2 * | 5/2017 | Ura | A63B 24/0003 |
| 10,121,066 | B1 * | 11/2018 | Cherveny | A61B 5/1128 |
| 10,445,930 | B1 * | 10/2019 | Saylor | G06T 7/251 |
| 10,485,454 | B2 * | 11/2019 | Tas | A61B 5/7246 |
| 2003/0040348 | A1 * | 2/2003 | Martens | A63B 24/0087 463/1 |
| 2003/0109322 | A1 * | 6/2003 | Funk | A63B 69/3614 473/222 |
| 2005/0239028 | A1 * | 10/2005 | Wu | A63B 21/0023 434/257 |

(Continued)

FOREIGN PATENT DOCUMENTS

| | | | | |
|---|---|---|---|---|
| WO | WO-2013105493 A1 * | 7/2013 | | G06F 3/0488 |
| WO | WO-2019183733 A1 * | 10/2019 | | G16H 40/67 |

*Primary Examiner* — James S. McClellan
(74) *Attorney, Agent, or Firm* — Fenwick & West LLP

(57) ABSTRACT

An exercise feedback system receives exercise data such as images or video captured by client devices of users performing exercises. The exercise feedback system may access a machine learning model trained using image of a population of users. The images used for training may be labeled, for example, as having proper or improper musculoskeletal form. The exercise feedback system may determine a metrics describing the musculoskeletal form of a user by applying the trained machine learning model to images of the user as input features. The exercise feedback system may generate feedback for a certain exercise using the metrics based on output predictions of the model. The feedback can be provided to a client device of the user or a physical therapist for presentation.

18 Claims, 6 Drawing Sheets

(56) References Cited

U.S. PATENT DOCUMENTS

| | | | | |
|---|---|---|---|---|
| 2007/0232453 A1* | 10/2007 | Hanoun | ............. | A63B 24/0062 482/7 |
| 2008/0086318 A1* | 4/2008 | Gilley | ................... | G06Q 10/06 705/319 |
| 2009/0220124 A1* | 9/2009 | Siegel | ................ | G06K 9/00342 382/103 |
| 2010/0022351 A1* | 1/2010 | Lanfermann | ...... | A63B 24/0006 482/1 |
| 2011/0275045 A1* | 11/2011 | Bhupathi | ............ | G09B 19/003 434/247 |
| 2012/0000300 A1* | 1/2012 | Sunagawa | ............ | A61B 5/4023 73/865.4 |
| 2012/0183939 A1* | 7/2012 | Aragones | ............... | A63B 24/00 434/247 |
| 2012/0271143 A1* | 10/2012 | Aragones | ........... | G09B 19/0038 600/407 |
| 2013/0029791 A1* | 1/2013 | Rose | ...................... | A63B 69/36 473/409 |
| 2013/0072353 A1* | 3/2013 | Alessandri | ......... | A63B 24/0006 482/8 |
| 2013/0089844 A1* | 4/2013 | Hutchison | .......... | G09B 19/0038 434/247 |
| 2013/0120445 A1* | 5/2013 | Shimomura | ............ | G06F 3/017 345/629 |
| 2013/0123667 A1* | 5/2013 | Komatireddy | ....... | A61B 5/7475 600/595 |
| 2013/0171601 A1* | 7/2013 | Yuasa | ..................... | A61B 5/744 434/258 |
| 2013/0223707 A1* | 8/2013 | Stephenson | ............ | G16H 20/30 382/128 |
| 2014/0148931 A1* | 5/2014 | Watanabe | ............... | A63B 71/06 700/92 |
| 2014/0172460 A1* | 6/2014 | Kohli | ..................... | G16H 20/40 705/3 |
| 2014/0228985 A1* | 8/2014 | Elliott | ................... | A63B 71/06 700/91 |
| 2014/0267611 A1* | 9/2014 | Kennett | ............. | G06K 9/00335 348/46 |
| 2014/0347392 A1* | 11/2014 | Odessky | ................. | G06T 13/40 345/633 |
| 2014/0364230 A1* | 12/2014 | Borghese | ................ | A63F 13/33 463/34 |
| 2014/0371634 A1* | 12/2014 | Jin | ....................... | A61B 5/1121 600/595 |
| 2015/0170530 A1* | 6/2015 | Damman | ................ | G09B 5/00 700/91 |
| 2015/0196804 A1* | 7/2015 | Koduri | ...................... | G06T 7/20 482/8 |
| 2016/0086500 A1* | 3/2016 | Kaleal, III | ............. | G06Q 10/10 434/257 |
| 2016/0263439 A1* | 9/2016 | Ackland | ................ | G16H 20/30 |
| 2016/0300347 A1* | 10/2016 | Dunn | ........................ | G06T 7/60 |
| 2017/0147789 A1* | 5/2017 | Wiedenhoefer | ........ | G16H 40/67 |
| 2017/0188894 A1* | 7/2017 | Chang | .................... | G16H 50/30 |
| 2017/0189752 A1* | 7/2017 | Mohrman | ............ | A61B 5/7271 |
| 2017/0273616 A1* | 9/2017 | Yang | ..................... | A61B 5/6828 |
| 2017/0354843 A1* | 12/2017 | Vuillerme | .............. | A61B 5/746 |
| 2017/0368413 A1* | 12/2017 | Shavit | ................ | G06K 9/00342 |
| 2018/0025664 A1* | 1/2018 | Clarke | ................... | A63B 69/00 434/257 |
| 2018/0054663 A1* | 2/2018 | Markison | ........... | A61B 5/02055 |
| 2018/0070864 A1* | 3/2018 | Schuster | .............. | A61B 5/0077 |
| 2018/0133551 A1* | 5/2018 | Chang | ................ | A63B 24/0075 |
| 2018/0184947 A1* | 7/2018 | Richards | ............. | A61B 5/0075 |
| 2018/0250552 A1* | 9/2018 | Liao | .................... | A63B 22/025 |
| 2018/0315247 A1* | 11/2018 | Van Andel | ......... | G06K 9/00342 |
| 2018/0339195 A1* | 11/2018 | Bernotas | ................ | H04N 7/147 |
| 2018/0353836 A1* | 12/2018 | Li | .............................. | G06T 7/20 |
| 2018/0357472 A1* | 12/2018 | Dreessen | .................. | G06T 3/60 |
| 2018/0374383 A1* | 12/2018 | Thielen | ................... | G06T 19/20 |
| 2019/0009133 A1* | 1/2019 | Mettler May | ...... | A63B 24/0075 |
| 2019/0038187 A1* | 2/2019 | Latella, Jr. | ............ | A61B 5/1128 |
| 2019/0125220 A1* | 5/2019 | Slepian | .................. | A61B 5/1128 |
| 2019/0325780 A1* | 10/2019 | Kim | ................ | G06N 20/00 |
| 2019/0362506 A1* | 11/2019 | Leroyer | .................... | G06T 7/97 |
| 2019/0366154 A1* | 12/2019 | Callaghan | .............. | G16H 40/67 |
| 2019/0374817 A1* | 12/2019 | Neuberger | ......... | A63B 71/0622 |
| 2020/0015736 A1* | 1/2020 | Alhathal | .................. | A61B 5/0077 |
| 2020/0038703 A1* | 2/2020 | Cleary | ................. | A61H 1/0266 |
| 2020/0051446 A1* | 2/2020 | Rubinstein | ............... | G09B 5/02 |
| 2020/0111384 A1* | 4/2020 | Bell | ......................... | G09B 5/02 |
| 2020/0197744 A1* | 6/2020 | Schweighofer | ...... | A61B 5/1121 |
| 2020/0250408 A1* | 8/2020 | Takeichi | ............ | G06K 9/00369 |
| 2020/0384342 A1* | 12/2020 | Nakashima | ........ | A63B 24/0062 |
| 2020/0398132 A1* | 12/2020 | Coza | ..................... | A63B 69/002 |

* cited by examiner

CLASSIFICATION OF MUSCULOSKELETAL FORM USING MACHINE LEARNING MODEL

BACKGROUND

This disclosure generally relates to exercises or posture for the musculoskeletal system and to providing feedback on musculoskeletal form.

Physical exercise and good posture help maintain the musculoskeletal system of the body and prevent conditions including chronic pain, arthritis, osteoporosis, or injury, among others. Individuals may seek feedback regarding musculoskeletal exercises from personnel such as physical therapists or electronic resources, for example, online guides, applications, or videos. However, existing systems and resources for exercise feedback do not provide individuals with customized evaluations on their exercises outside of in-person sessions with physical therapists, for instance, feedback indicating whether the individuals are performing exercises with proper musculoskeletal form per repetition. It would be desirable for individuals to receive personalized physical therapy regardless of the exercise setting, which may encourage users to perform more exercises at home or work, and thus promote a healthy musculoskeletal system or overall fitness. Moreover, it can be time consuming for physical therapists to manually review performance and provided feedback on an individual-by-individual basis.

SUMMARY

An exercise feedback system uses a trained machine learning model to provide feedback regarding musculoskeletal form of users. The exercise feedback system receives images or video captured by client devices of users performing musculoskeletal exercises or holding a posture. During training, images and video that are manually labeled by the users or physical trainers may be used as training data for the machine learning model. Through training, the machine learning model may learn to determine metrics describing musculoskeletal form, or to predict proper or improper form automatically without requiring manual labeling or classification of images. Using a trained machine learning model, the exercise feedback system may provide feedback, for example, in graphical or verbal form, for presentation by client devices while users are performing exercises.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
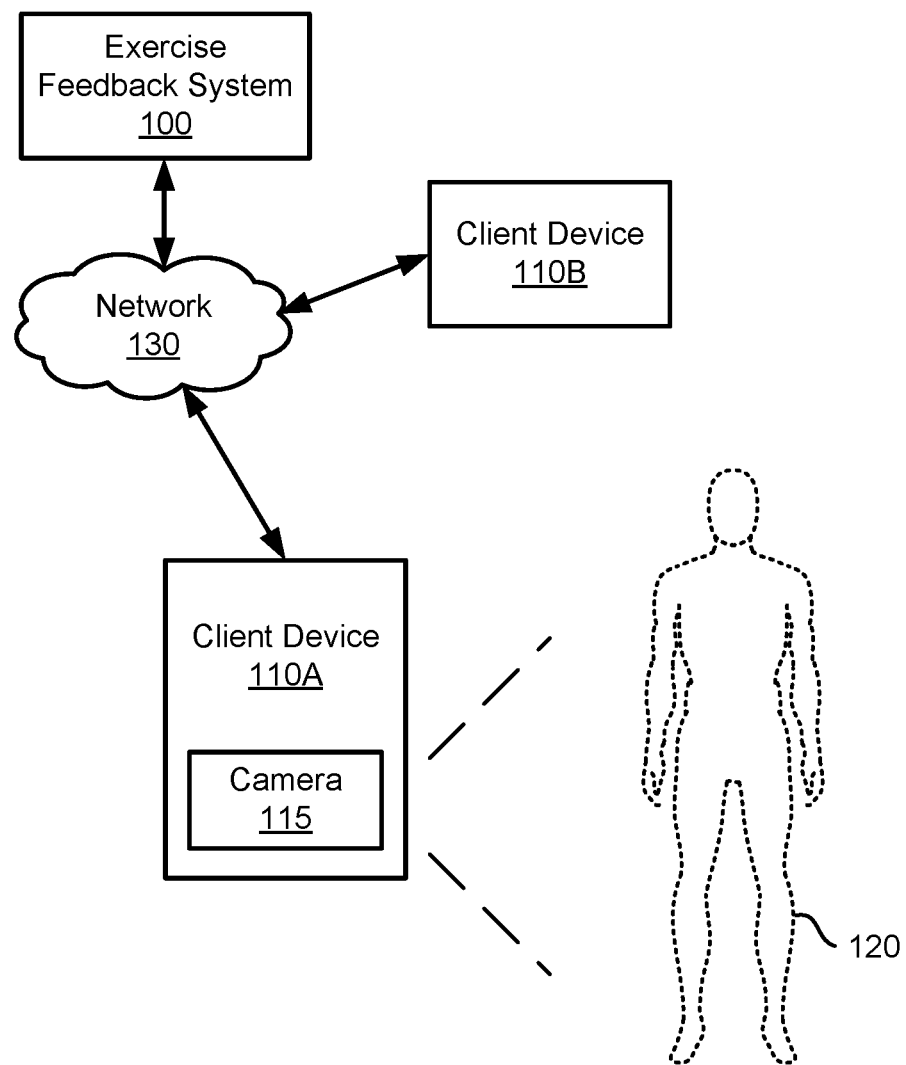
FIG. 1 is a diagram of a system environment for an exercise feedback system according to an embodiment.

FIG. 1 is a diagram of a system environment for an exercise feedback system 100 according to an embodiment. The system environment comprises the exercise feedback system 100 and client devices 110A and 110B (collectively referenced herein as client devices 110 or a client device 110), which are connected to each other via the network 130 (e.g., the Internet, WIFI, or BLUETOOTH®). For clarity, a limited number of client devices 110 are shown. However, other embodiments may include additional client devices 110 of users or providers of the exercise feedback system 100. Furthermore, the system environment may include different or other additional entities.

The exercise feedback system 100 provides feedback to users for exercises performed by the users or posture of the users. For example, the feedback indicates musculoskeletal form of a body 120 of a user to help guide proper form while performing exercises, or while sitting at a desk. The feedback may be determined using one or more trained models (e.g., machine learning models), input from providers of the exercise feedback system 100, or other types of information. For purposes of explanation, this disclosure generally refers to physical therapists as providers. However, the embodiments described herein may be adapted for other types of providers such as athletic trainers, doctors, physicians, coaches, clinicians, nurses, and the like, who are suited to provide input regarding exercise performance or health of users for specific areas or in general.

The exercise feedback system 100 is a computer system configured to store, receive, and transmit data to clients 110 via the network 130. In some embodiments, the exercise feedback system 100 executes on one or more servers, which may include a singular computing system, such as a single computer, or a network of computing systems, such as a data center or a distributed computing system. The server may receive requests for data from clients 110 and respond by transmitting the requested data to the client devices 110. The exercise feedback system 100 is further described below with reference to FIG. 2.

The client device 110A includes one or more sensors 115 to capture exercise data or other user information of a user before, during, or after performance of an exercise. Sensors 115 may include, e.g., a camera, depth sensor, ultrasound sensor, illumination source, infrared camera, light sensor, proximity sensor, etc. Exercise data may include image data, video data, or other types of exercise-related information. For example, an image indicates musculoskeletal form of the body 120 of the user while performing an exercise. In some embodiments, the exercise feedback system 100 provides an image or video or a user for display on the client device 110B of a provider. The exercise feedback system 100 may use input (e.g., a classification of musculoskeletal form) input received from the provider via the client device 110B to train a model or generate feedback.

In some embodiments, a client device 110 includes an electronic display for presenting images, feedback, or other exercise related information. The electronic display and a camera (or another type of sensor 115) may be positioned on a same side of the client device 110 such that the user may view feedback displayed on the electronic display while performing an exercise. Particularly, the user may position and orient the client device 110 such that the side including the electronic display and camera is facing the user. The camera may be positioned can capture exercise data of the user while the user is performing the exercise and viewing the electronic display. The field of view of the camera can capture at least a portion, or all of, the body 120 of the user. In an embodiment, the client device 110A is positioned using a reference point, e.g., a level surface of the ground or another object in the field of view of a sensor 115. In other embodiments, the client device 110 includes a different type of display device (e.g., a projector) for presenting feedback or other media.

Each client device 110 comprises one or more computing devices capable of processing data as well as transmitting and receiving data via the network 130. For example, a client 110 may be a mobile phone, smartphone, augmented reality (AR), virtual reality (VR), or mixed reality device, a desktop computer, a laptop computer, a tablet computing device, an Internet of Things (IoT) device, or any other device having computing and data communication capabilities. A client device 110 may include a processor for manipulating and processing data, and a storage medium for storing data and program instructions associated with various applications.

Figure 2:
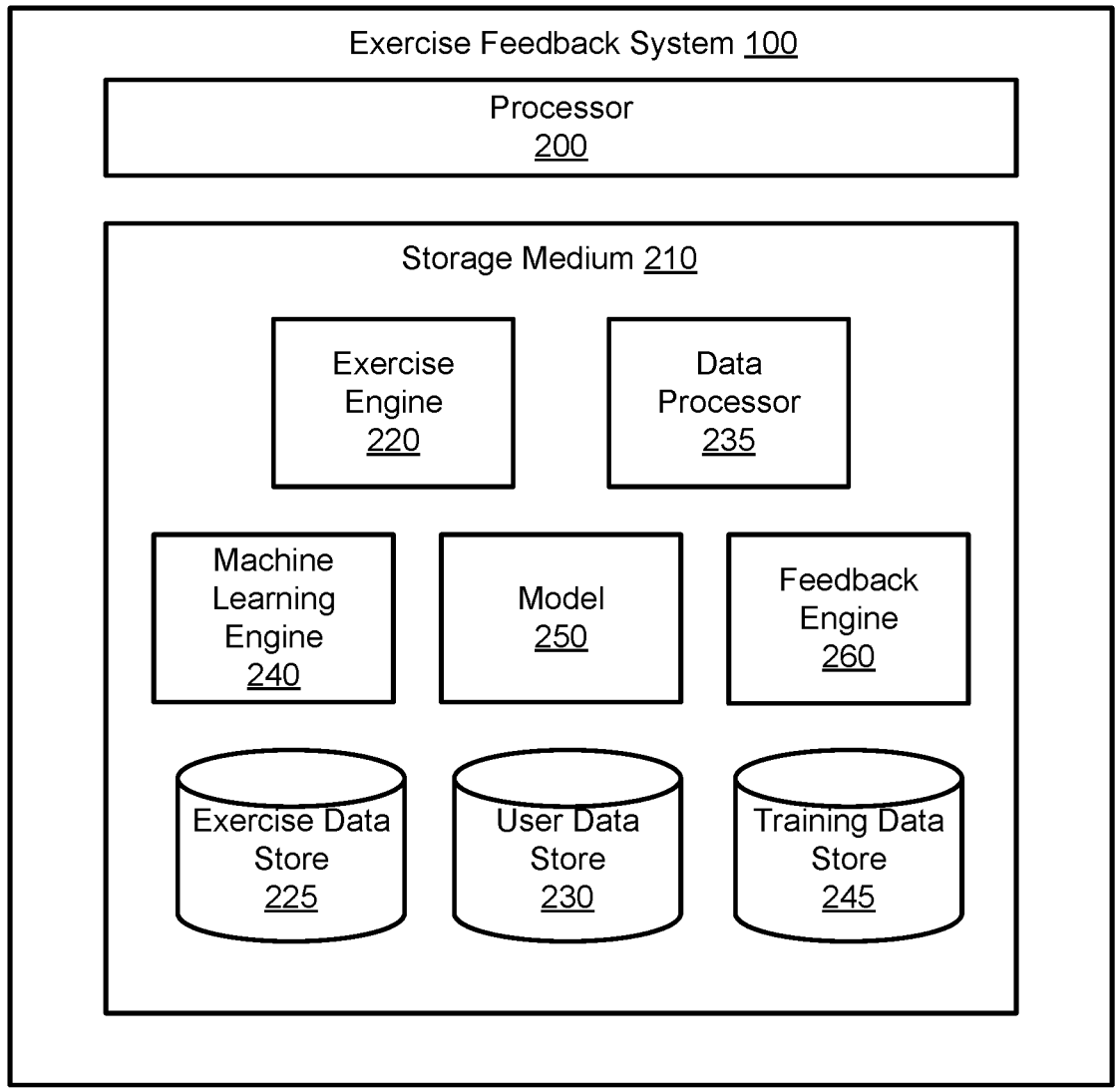
FIG. 2 is block diagram of an exercise feedback system according to an embodiment.

FIG. 2 is block diagram of an exercise feedback system 100 according to an embodiment. The exercise feedback system 100 includes a processor 200 for manipulating and processing data, and a storage medium 210 for storing data and program instructions associated with various modules. The storage medium 210 includes an exercise engine 220, exercise data store 225, user data store 230, data processor 235, machine learning engine 240, training data store 245, one or more models 250, and feedback engine 260. Alternative embodiments may include different or additional modules or omit one or more of the illustrated modules.

Components of the exercise feedback system 100 may be distributed on one or more computing devices, e.g., servers or client devices 110. For instance, a server executing the machine learning engine 270 may train a model 250 and provide the trained model 250 to a client device 110, which may store the trained model 250 in local memory for later use. As another example, a client device 110 may have a data processor 235 that filters or extracts information from sensor data before transmitting to the exercise feedback system 100 executing on a server for further processing. Thus, the client device 110 may perform at least some functionality of the exercise feedback system 100 locally, e.g., without necessarily requiring a network connection to a server.

The storage medium 210 may include both volatile memory (e.g., random access memory) and non-volatile storage memory such as hard disks, flash memory, and external memory storage devices. In addition to storing program instructions, the storage medium 210 stores various data associated with operation of applications. In one embodiment, the storage medium 210 comprises a non-transitory computer-readable storage medium. Various executable programs are embodied as computer-executable instructions stored to the non-transitory computer-readable storage medium. The instructions, when executed by the processor 200, cause the exercise feedback system 100 to perform the functions attributed to the programs described herein.

The exercise engine 220 provides exercise information to client devices 110. The exercise information may describe exercises to be performed by users. In some embodiments, the exercise information includes one or more types of media (e.g., image, photo, video, text, audio, etc.) indicating musculoskeletal form or instructions for performing an exercise. The musculoskeletal form may be a representation of a user's current form or a target (e.g., proper or correct) form for a certain exercise. The exercise engine 220 can store or retrieve exercise information from the exercise data store 225. For instance, the exercise data store 225 includes a database of multiple types of exercises. Exercises may be organized into different categories, for example, a particular area of the body (e.g., neck, shoulder, elbow, wrist, back, hip, knee, ankle, whole body) or level of difficulty. In addition to including musculoskeletal form for exercises, the exercise data store 225 may also include musculoskeletal form for certain postures, e.g., sitting at a desk or in a driver seat of a vehicle.

In some embodiments, exercise information includes exercise workouts, e.g., to be completed in one session. An exercise workout includes one or more exercise sets, and an exercise set includes a number of repetitions of an exercise. For exercises involving weights e.g., a barbell or dumbbell, the exercise set may be associated with an amount of weight for the set. In addition, the exercise workout may have an expected duration of time (required to complete the exercises) and one or more goals. Goals may be aimed at improving flexibility, mobility, stamina, or strength of at least one particular area of the body, overall health, or for performing under certain condition, e.g., indoors at an office vs. at a gym with more equipment. Exercise workouts may indicate certain equipment required for one or more of the exercise sets, e.g., a towel, chair, table, step, resistance band, foam roller, bench, wall, etc.

The exercise engine 220 manages user profiles of users and providers of the exercise feedback system 100. The exercise engine 220 may store or retrieve user information from the user data store 230. User information may include, for example, demographic data, geographical location, media (e.g., an uploaded photo or video of a user), adherence in completing exercises, preferences, or other relevant information. The exercise engine 220 may manage associations between users and providers. For instance, a user may have one or more providers such as a general physical trainer and a back pain specialist, and a provider may have one or more users as patients. The exercise engine 220 may track exercises previously performed by a user, currently being performed by a user, or recommended for a user by the exercise feedback system 100.

The data processor 235 processes sensor data received from client devices 110 to extract information or features that may be used for training a model 250 or providing feedback to users. The data processor 235 may use image or video processing techniques known to one skilled in the art to analyze media captured by client devices 110. In some embodiments, the data processor 235 uses object detection or edge detection algorithms to determine position or orientation of a certain portion or segment (e.g., limb, joint, torso, or head) of a user as shown in an image or frame of a video. For example, the data processor 235 determines an angle of a joint or portion of the body of a user by detecting orientation of two adjacent segments of the body (e.g., upper and lower arms or legs). The data processor 235 may also determine a position or orientation of a portion or segment of the body relative to a reference frame or a reference point, e.g., based on a stationary object in an image.

In some embodiments, the data processor 235 determines features using detected motion of the user. For example, the data processor 235 generates position data of a portion of the user's body over time, e.g., a motion profile of the portion of the body. The change in position may be determined using image processing techniques as described above and using an input video or sequence of images. By analyzing the position data, the data processor 235 can determine a rate of change in the position of the portion of the body or range of motion, which may be associated with a particular exercise. For instance, the rate of change indicates how quickly a user is performing repetitions of a pushup exercise, and the range of motion indicates a minimum and maximum degree to which the user's elbows bent during one of the pushups. In an embodiment, the data processor 235 determines a minimum or maximum position in a trajectory of the user's back or another portion of the body. Determination of features by the data processor 235 is further described below with reference to FIG. 3.

The machine learning engine 240 generates or trains one or more models 250, also referred to herein as machine learning models, for determining metrics describing musculoskeletal form of users. The metric may indicate whether a user's musculoskeletal form matches a target musculoskeletal form (e.g., within a threshold error), or a measurement (e.g., low, medium, high, or a percentage) of how close the user's musculoskeletal form matches the target musculoskeletal form. The machine learning engine 240 may use training data including exercise information, user information, outputs from other components of the exercise feedback system 100, or some combination thereof. The training data may be retrieved from the training data store 245, a client device 110, or another source external to the exercise feedback system 100. Furthermore, the training data may generated or collected using information from one or more users. For instance, the machine learning engine 240 aggregates images (or video) of users performing exercises captured by client devices 110 of the users. The images may be associated with user or exercise information such as demographics or a type of exercise. Thus, the machine learning engine 240 can organize training data into sets having at least one commonality. For example, training sets are categorized based on age range, or to differentiate images of lower body exercises and upper body exercises. The machine learning engine 240 may train a model 250 using one or more types of machine learning algorithms, as described in detail below.

In some embodiments, the machine learning engine 240 performs supervised learning. As an example use case, the training data in supervised learning includes images or video labeled with a classification of musculoskeletal form. The classification may be a Boolean (e.g., "proper" or "improper" form) or may be a range of values (e.g., a percentage or numerical rating indicating how close a user's form resembles a target musculoskeletal form). A model 250 trained using supervised learning determines one or more independent variables that may be used to predict a value of a dependent variable, e.g., whether an image shows a user performing an exercise or holding a posture that is similar to a target musculoskeletal form, or a level of similarity with the target musculoskeletal form. The model 250 may determine the independent variables by analyzing commonalities, correlations, or differences in features between images with the various classifications. For instance, an independent variable (e.g., a feature) may be a degree of curvature of a user's back while performing a pushup exercise. The model 250 learns that images of users performing the pushup with proper musculoskeletal form have a back that is approximately straight, i.e., less than or equal to a threshold degree of curvature. Based on this independent variable, the model 250 may determine that images of users having a curvature of the back that is greater than the threshold degree while performing the pushup are associated with improper musculoskeletal form.

In other embodiments, the machine learning engine 240 performs unsupervised learning using training data that is not necessarily labeled with classifications. In contrast to supervised learning for prediction of a dependent variable (e.g., proper or improper form), a model 250 trained using unsupervised learning determines clusters of the training data. For example, the training data may include images or videos of users performing exercises or holding a posture. The model 250 may group the images into clusters based on shared or similar attributes or features. For instance, a first cluster includes images of upper body exercises, while a second cluster includes images of lower body exercises. The model 250 may learn to distinguish the upper and lower body exercises based on features such as motion of segments of the body. Particularly, the legs tend to have greater motion than the arms during a lower body exercise, and vice versa for an upper body exercise. In some embodiments, the clusters represent images of proper or improper form, or different levels of similarity to a target musculoskeletal form.

For both examples of supervised learning and unsupervised learning, the trained model 250 may generate a prediction based on one or more inputs, where the predication may be associated with a metric describing musculoskeletal form. For instance, an input is an image of a user's form while performing an exercise. In the case of supervised learning, the model 250 predicts whether the user's form (or by extension, the input image) should be classified as representing proper or improper musculoskeletal form. In the case of unsupervised learning, the model 250 predicts a cluster for classification of the user's form. Example supervised learning algorithms include linear or logistic regression, support vector machines, decision trees, random forest, nearest neighbor, or naïve Bayes, among others. Example unsupervised learning algorithms include clustering (e.g., using k-mean, mixture models, or hierarchical clustering) neural networks, expectation maximization, anomaly detection, among others.

In some embodiments, the machine learning engine 240 uses previously generated predictions as feedback to train a model 250 in a trial and error process, e.g., reinforcement learning. Responsive to an incorrect prediction (e.g., a false positive or false negative), the model 250 may adjust future predictions. As an example, the model 250 may incorrectly predict that an image shows a user performing an exercise using proper musculoskeletal form, when the image actually shows improper musculoskeletal form. Accordingly, the model 250 may learn that certain features are not as predictive of musculoskeletal form and modify mappings, functions, or coefficient values of the model 250 to reflect the learning from feedback. The correct classification of musculoskeletal form may be manually provided in labeled training data, or determined using input from providers. In some embodiments, classifications of training data are determined via crowd-sourcing across multiple providers. Example reinforcement learning algorithms include Markov decision processes and Monte Carlo methods, among others.

In various embodiments, a machine learning model 250 generated or trained by the machine learning engine 240 using any of the types of learning described above represents a function or mapping of one or more input values to an output. The function or mapping includes one or more coefficient values. For example, in supervised learning using linear regression, the coefficient values represent a slope or offset (e.g., y-intercept) of a regression line. As another example, in unsupervised learning using a neural network, the coefficient values represent weights between nodes of the neural network. The coefficients of a model 250 are determined based on analysis of one or more features, which are measurable properties or observed characteristics. In supervised learning, features may include the independent variables (e.g., curvature of a user's back while performing a pushup) used as a predictor for a dependent variable. In unsupervised learning, features may include parameters used in an input layer of a neural network. Additionally, features may be based on attributes detected by the data processor 235, e.g., range of motion or rate of change in position of a portion of the user's body. In some embodiments, the machine learning model 250 models a distribution of values of a feature observed in training data. The machine learning model 250 may determine coefficients that represent parameters of the distribution, e.g., a Gamma or Poisson distribution.

The machine learning engine 240 may store the coefficients of a trained model 250 in memory of the exercise feedback system 100, or provide the coefficients to a client device 110. Once a model 250 is trained, the exercise feedback system 100 may access the trained model 250 and apply the trained model 250 to input features or data for determining predictions. For instance, the exercise feedback system 100 retrieves stored coefficients of the trained model 250 and calculates an output by applying input features to a function or mapping with the coefficients. The model 250 may be trained using information from a training data population of users, and the exercise feedback system 100 may apply the trained 250 to generate predictions for another user, who may not necessarily be included in the training data population. Moreover, the coefficients may be updated over time based on re-training with additional training data.

The feedback engine 260 generates feedback associated with musculoskeletal form using output of one or more trained models 250. The feedback engine 260 may provide the feedback to client devices 110 for presentation to users. The feedback may indicate, in graphical or verbal form, whether a user is performing or performed an exercise with proper musculoskeletal form, or whether the user is holding a proper posture. The feedback may be a Boolean (e.g., proper or improper form) or a numeric value such as a score or a metric (e.g., an angle of a joint of the body, or a rating of how closely a user matches the proper form) and may be based on one or more predictions determined by at least one trained model 250. In various embodiments, feedback may also include comments, classifications, or other text describing performance of an exercise (e.g., "extend arm" or "straighten back"). The feedback may indicate a target musculoskeletal form, e.g., that the knee should be bent at (or approximately) a 90 degree angle for a portion of a given exercise.

By using a machine learning model 250 to provide musculoskeletal form related feedback, the exercise feedback system 100 can provide an advantage over conventional methods for physical therapy. The exercise feedback system 100 may leverage large sets of exercise information from a population of users as training data for the machine learning model 250. For example, by analyzing sets of images of the users performing exercises, the machine learning model 250 can identify patterns or trends and learn to predict whether an image (that has not yet been labeled or classified) likely shows proper musculoskeletal form or should belong in a specific cluster of images having features in common.

In addition to analyzing images, the machine learning model 250 may also consider other types of input such as labels or metadata, e.g., associated with the images. By taking into account these factors, the machine learning model 250 can provide more granular or customized predictions. In one use case, a model 250 trained using sets of training images labeled with a height (or height range) of the corresponding user may determine differences in features between users in different height ranges. For example, the trained model 250 determines that the motion profile of musculoskeletal form of users when performing a repetition of a certain exercise follows a different path between shorter and taller subset of users. In addition to height, other factors that models 250 can consider when processing training data include age, type of sport, player position for a sport, ethnicity, weight, level of fitness, or other physical attributes or conditions.

In contrast to manual review by physical therapists on an image-to-image or individual-to-individual basis, the machine learning model 250 can automatically generate predictions using the information (e.g., coefficients) learned during previous training. Furthermore, the machine learning model 250 can aggregate training data with labels or classifications provided by multiple physical therapists or other types of providers, which may improve the accuracy of predictions by accounting for a greater range of contextual information, or by normalizing for any provider-specific bias. Aggregating inputs from multiple providers may also help filter outliers in the training data, or determine an average value, because individual labels or classifications can vary based on provider-to-provider subjectivity in evaluating musculoskeletal form.

Figure 3:
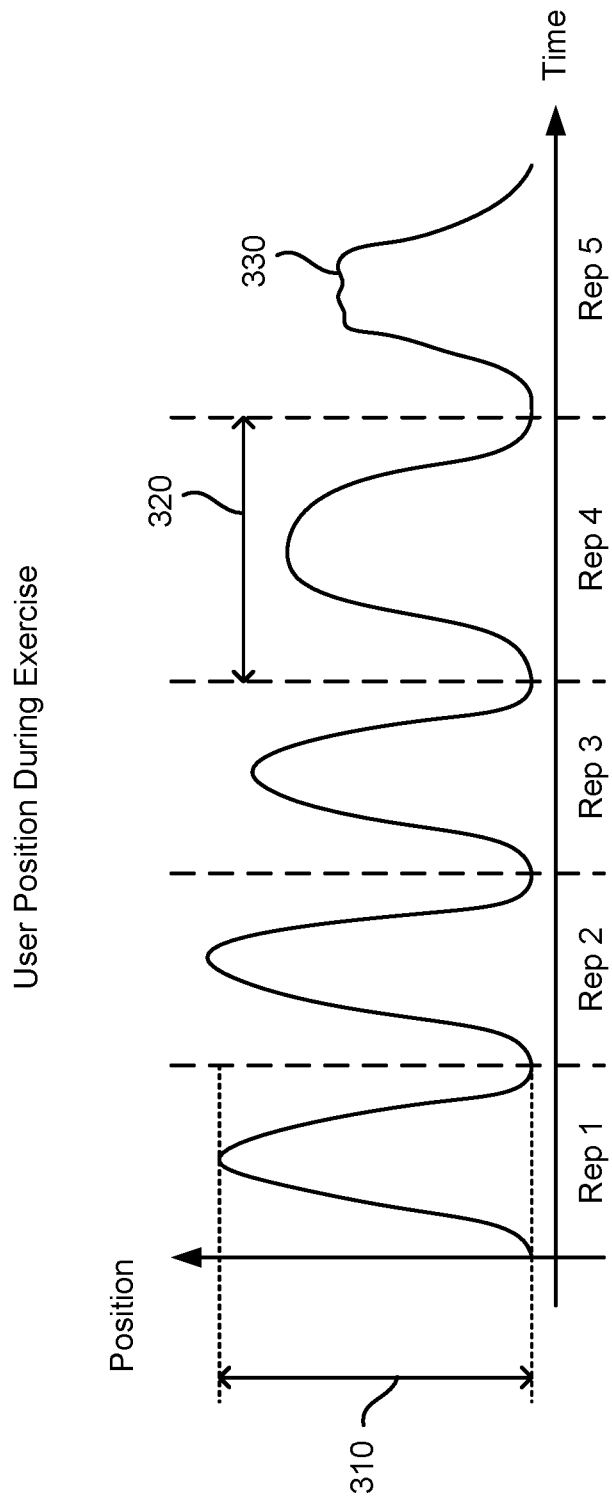
FIG. 3 illustrates example features used by a machine learning model to detect musculoskeletal form of users according to an embodiment.

FIG. 3 illustrates example features used by a machine learning model to detect musculoskeletal form of users according to an embodiment. In the example shown in FIG. 3, the data processor 235 processes a video or set of images of a user performing an exercise to determine a motion profile. The motion profile represents a position of a portion of the user's body over time as the user performs the exercise. In other embodiments, the data processor 235 may use motion data from sensors (e.g., of a wearable device worn by the user) in addition (or alternatively) to using images or video to determine the motion profile.

In an embodiment, the motion profile represents the position of the user's upper leg (or thigh) while performing repetitions of a squat exercise. The data processor 235 may determine features such as a range of motion 310 of the upper leg or a duration of time 320 required to perform a given repetition of the squat exercise. Features for a specific repetition may be provided as training data for a model 250. Additionally, features may be aggregated across a set of repetitions or a workout including multiple sets of exercises. By analyzing features of the sequence of repetitions illustrated in the example of FIG. 3, the model 250 may determine temporal trends or an inflection point in the motion profile. As an example, a trend indicates that a user is (e.g., gradually) becoming fatigued, and the inflection point may indicate a time or repetition during an exercise when a user's musculoskeletal form changes from proper to improper, or otherwise shows signs of fatigue.

In the example shown in FIG. 3, the model 250 determines that the user shows more noticeable signs of fatigue after the third repetition. In particular, the user's range of motion decreases (e.g., by at least a threshold distance or below a threshold range) overall from the first repetition to the fourth repetition. Additionally, the user's duration of time required to perform a repetition increases (e.g., to become greater than at least a threshold time) from the first repetition to the fourth repetition. Accordingly, the model 250 generate a prediction that the user performed the fourth repetition with improper musculoskeletal form, or deviated from a target musculoskeletal form by at least a threshold, e.g., distance or time corresponding to the aforementioned range of motion and duration of time features, respectively. The threshold distance or time may be predetermined for a certain exercise or user, or learned by a model 250 based on expected range of motion and repetition time of exercises completed by a population of users in training data. Moreover, the model 250 may updated the thresholds as a user progresses in exercise performance, e.g., thus increasing the range of motion achievable by a user or the strength of the user to perform repetitions more quickly.

Following in the above example, fatigue may also cause the user's upper leg to shake or jitter during a repetition. The model 250 may use anomaly detection to determine that the motion profile of the fifth repetition of FIG. 3 includes an anomaly 330. Particularly, the model 250 may determine that jitter of the upper leg is evident in the motion profile by small fluctuations in the upper leg position during a sitting position of the squat. The model 250 may determine that certain types of anomalies are indicative of improper or potentially unsafe musculoskeletal form.

Example Musculoskeletal Forms

Figure 4:
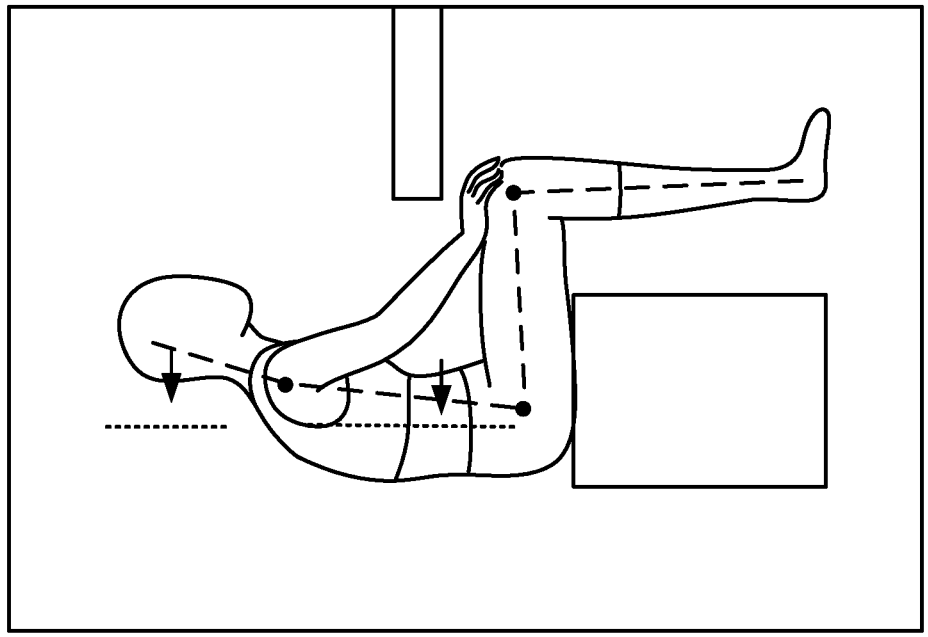
FIG. 4 illustrates comparison of musculoskeletal form according to an embodiment.
Figure 4:
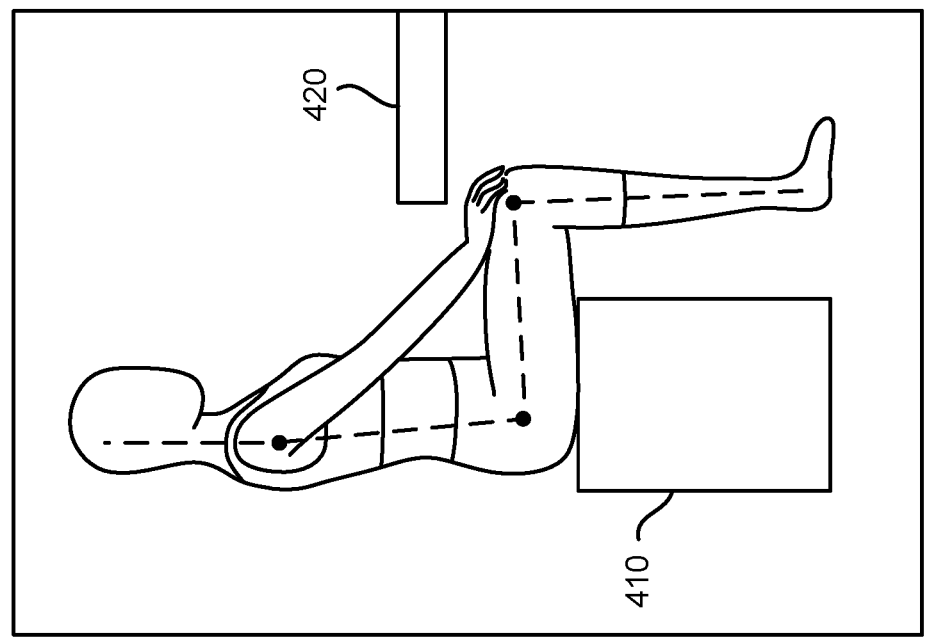

FIG. 4 illustrates comparison of musculoskeletal form according to an embodiment. Diagram 400 illustrates an example image of a user holding a posture sitting on a chair 410 at a desk 420. The data processor 235 may use image processing techniques to determine the position or orientation of various portions of the user's body, which may be used to determine the user's musculoskeletal form. In some embodiments, the data processor 235 determines a skeletal ("stick figure") model of musculoskeletal form, where the skeletal model includes one or more segments connected at joints, as indicated by the dotted lines in FIG. 4. For example, the data processor 235 determines that the user's legs are bent at approximately 90 degrees at the knee when holding the posture. Additionally, the data processor 235 may determine that the user's back and neck are approximately aligned to each other and orthogonal to the ground. The data processor 235 may determine the position or orientation of the chair 410 or desk 420 to use as a reference when determining the musculoskeletal form of the user. For example, the data processor 235 uses a surface of the chair 410 or desk 420 to determine a horizontal plane representing the ground in an image. In other embodiments, the data processor 235 can use other objects nearby a user as a reference.

In some embodiments, the data processor 235 associates a skeletal model with one or more classifications or labels, e.g., corresponding to an image from which the skeletal model is determined. For instance, the data processor 235 processes an image of a user sitting in a proper ergonomic posture at a desk to determine the skeletal model shown in diagram 400. Thus, the data processor 235 classifies the skeletal model as indicative of proper musculoskeletal form. The skeletal model may also be labeled as representing musculoskeletal form of posture at a desk. Labels may also indicate other types or settings of posture, for instance, sitting in a car, standing at a standing desk, or laying on a bed.

The machine learning engine 240 may use skeletal models to train a model 250. The trained model 250 can determine features of skeletal models that may be used to determine predictions regarding musculoskeletal form. As an example feature, the trained model 250 determines that a certain joint should be bent within a particular range of degrees when holding a proper posture (e.g., knees bent at approximately 90 degrees when sitting). In some embodiments, the trained model 250 analyzes skeletal model of multiple users to determine average position or orientation of certain portions of the body when the users are holding a posture having proper (or improper) musculoskeletal form.

In some embodiments, the data processor 235 determines skeletal models representing a user's musculoskeletal form while performing an exercise. The skeletal model may include position or orientation information of the body for multiple stages of an exercise. As an example, a squat exercise includes a first stage where the user is standing upright and a second stage where the user is squatting. The data processor 235 may determine frames of a video or images of a sequence of images that correspond to the first and second stages. In some embodiments, the skeletal model includes a motion profile, e.g., information describing changes in position or orientation information of the body over time as the user performs an exercise.

Diagram 430 illustrates another example image of a user holding a posture. The data processor 235 may determine that the user shown in the image is holding a posture sitting at a desk, e.g., responsive to determining presence of a chair or a desk similar to the chair 410 or desk 420, respectively, included in the image corresponding to diagram 400. In an embodiment, the data processor 235 determines a skeletal model of the user's musculoskeletal form and provides the skeletal model as input to a model 250 trained with skeletal models of the user or other users. As an example, a model 250 trained using a skeletal model representing proper sitting posture shown in diagram 400 may predict that the sitting posture shown in diagram 430 is improper. In particular, the model 250 uses features such as an angle of the user's back relative to the ground, or an angle of the user's back relative to the user's neck or head. Responsive to determining that one or more of these angles deviates from a target angle (or range of angles) by at least a threshold degree, the trained model 250 may determine that the user as shown in diagram 430 is sitting improperly. In some embodiments, the trained model 250 tracks progression of a user's posture over time to determine whether the user's musculoskeletal form is improving or become potentially unsafe.

The trained model 250 may determine to compare features of skeletal models associated with common labels or classification. In the example shown in FIG. 4, the skeletal models are both associated with images of a user sitting at a desk. For an input skeletal model determined using an image of a user in a standing posture, the trained model 250 determines predictions using features of other skeletal models associated with images of users in standing instead of sitting posture. In embodiments where a model 250 is trained using features from a population of users labeled with demographic information or other context, the trained model 250 can be applied to a skeletal model of a user. The trained model 250 determines a prediction regarding the skeletal model of the user based on features of skeletal models of other users in the population who having a same gender, age range, height, weight, level of fitness, and the like.

In some embodiments, the feedback engine 260 provides biofeedback determined based on predictions of a trained model 250 applied to a skeletal model of a user. In the example illustrated in FIG. 4, the trained model 250 determines that the user is slouching and thus demonstrating improper musculoskeletal form in a sitting posture. Specifically, the trained model 250 may determine that the user's back is not approximately (e.g., within a threshold degree) orthogonal to the ground or seat of a chair. Furthermore, the trained model 250 may determine that the user's neck or head is not aligned with the user's back, which may cause strain on the neck or shoulders. The feedback engine 260 may provide to the user feedback that indicates these deviations from proper musculoskeletal form. For example, the feedback engine 260 provides a visualization of the skeletal model overlaid on an image or video of the user's body. In some embodiments, the feedback engine 260 uses an avatar or anonymized depiction of the user's body instead of an image or video. The feedback may also include an indication of a target position or orientation of a portion of the body. As shown by the arrows in diagram 430, the back, neck, and head of the user should be adjusted to be more parallel to each other and orthogonal to the ground. In other embodiments, the feedback may present this information to the user in verbal or audio form instead of using images, video, or other visuals displayed by a client device 110 of the user.

Figure 5:
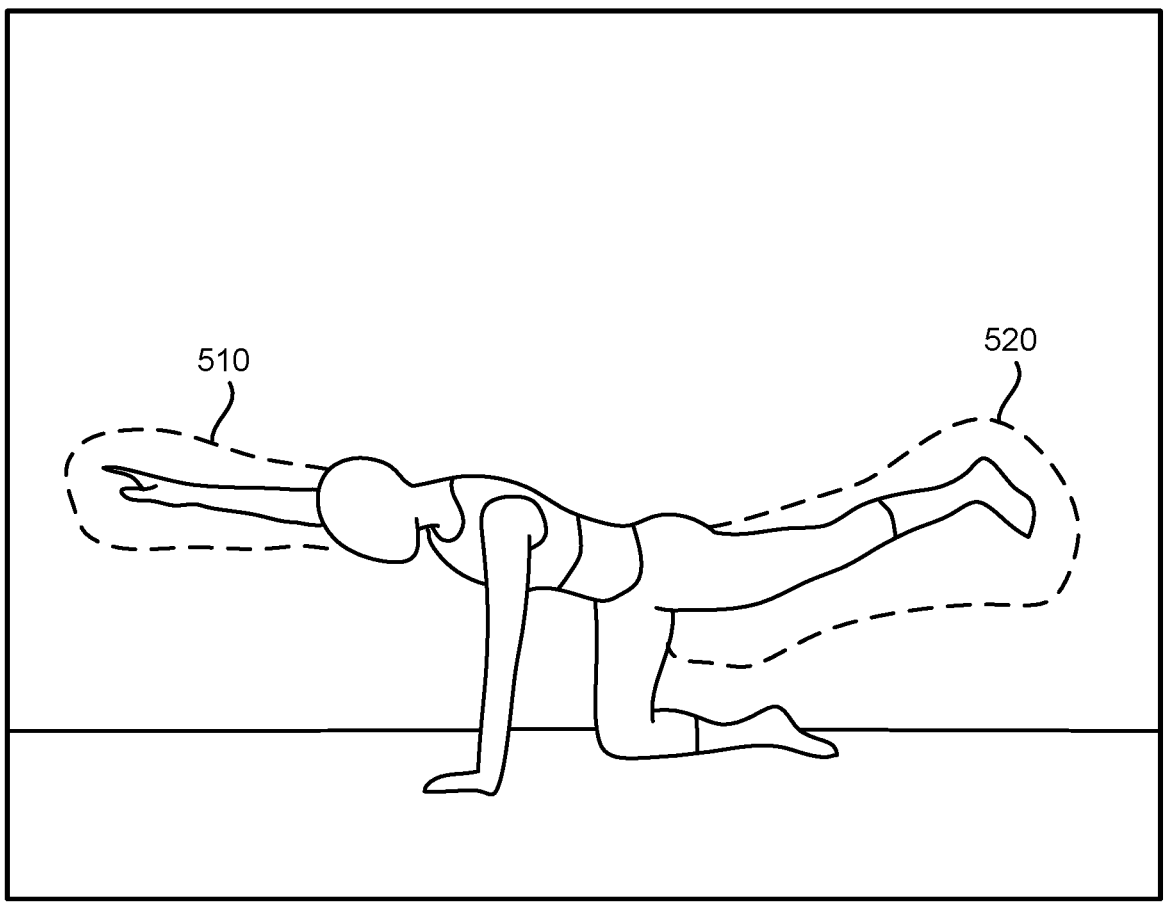
FIG. 5 illustrates a range of positions for an exercise according to an embodiment.

FIG. 5 illustrates a range of positions for an exercise according to an embodiment. The example diagram 500 shows a user performing a kneeling superman exercise. The feedback engine 260 may provide feedback to present a range of positions for a particular portion of the body when performing the kneeling superman exercise. In an embodiment, a trained model 250 may determine the range of positions based on training data including a sample of images of a population of users performing the exercise. By analyzing the sample of images, the trained model can determine an average position of a portion of the body, as well as a variation (e.g., standard deviation) in position of the portion of the body across the sample.

As shown in the embodiment of FIG. 5, the feedback engine 260 can provide feedback in the form of a first graphic 510 of the range of position of an extended arm and a second graphic 520 of the range of position of an extended leg of the user. The feedback engine 260 may overlay the graphics 510 and 520 on an image or video of the user for display by a client device 110. The boundary of the graphics may represent the variation in position at a certain standard deviation from the average (e.g., one or two standard deviations). In some embodiments, the feedback engine 260 provides the graphics of the range of positions in an augmented reality environment. By observing the graphics as while performing an exercise, a user can determine how closely the user's musculoskeletal form resembles a target range, and the user may adjust the user's musculoskeletal form based on observed discrepancies. In some embodiments, the graphics include a temporal component, e.g., showing range of positions over time while tracking motion of a portion of the body during an exercise.

Example Process Flows

Figure 6:
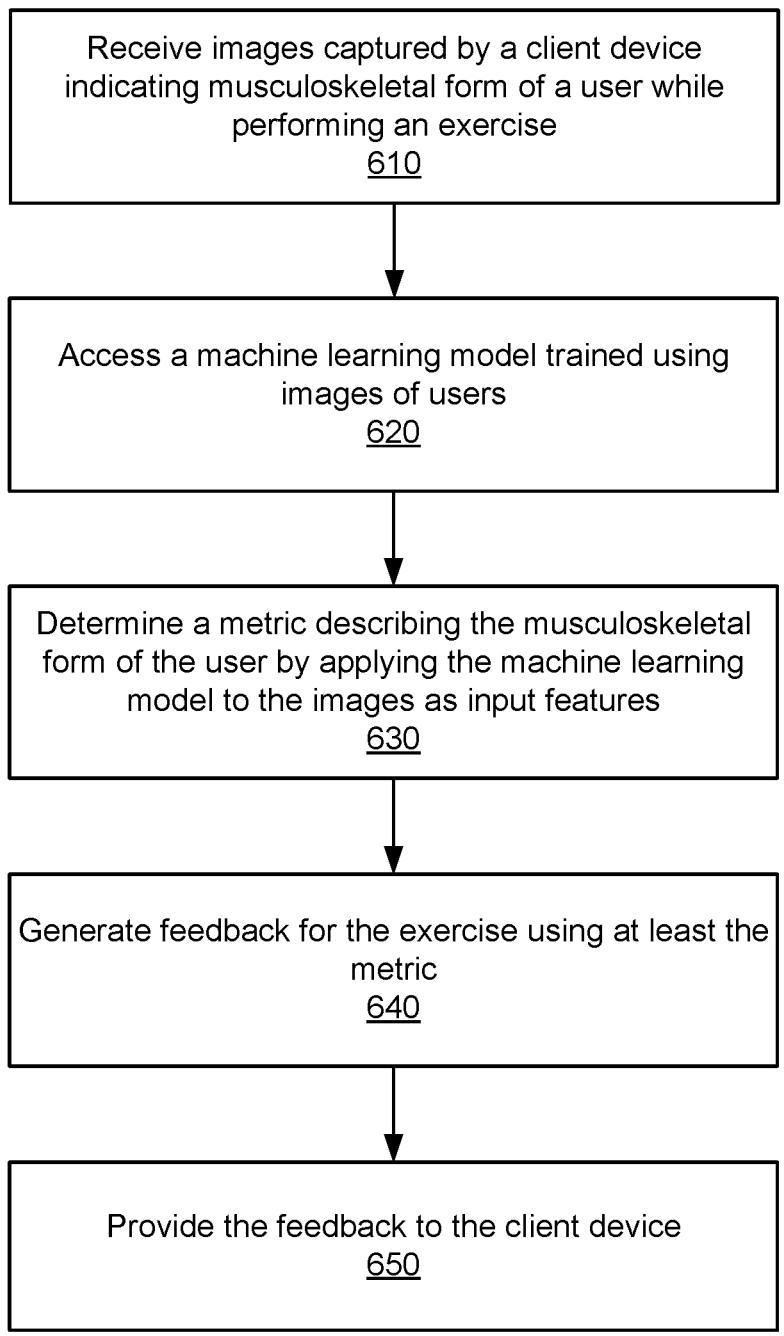
FIG. 6 is a flowchart illustrating a process of providing feedback for exercises according to an embodiment.

FIG. 6 is a flowchart illustrating a process 600 for providing feedback for musculoskeletal exercises according to an embodiment. In some embodiments, the process 600 is performed by the exercise feedback system 100, e.g., via the components shown in FIG. 2, within the system environment in FIG. 1. The process 600 may include different or additional steps than those described in conjunction with FIG. 6 in some embodiments or perform steps in different orders than the order described in conjunction with FIG. 6.

In an embodiment, the exercise feedback system 100 receives 610 a set of images from a client device 110 indicating musculoskeletal form of a user while performing an exercise. The set of images may include one or more images captured by a camera 115 of the client device 110. In other embodiments, the camera 115 captures a video and may use one or more frames of the video as images for processing. The images may also include 3D information based on data captured by a depth sensor of the client device 110.

The exercise feedback system 100 accesses 620 a machine learning model 250 trained using images of users, for instance, with and without proper musculoskeletal form while performing the exercise. The machine learning model 250 can predict whether the user had proper musculoskeletal form while performing the exercise. The images for training may also be associated with one or more other types of labels or classifications, e.g., type of exercise or user information. The images may be organized by user information such as physical attributes (e.g., value or range of values of height or weight). The exercise feedback system 100 determines 630 a metric describing the musculoskeletal form of the user by applying the trained machine learning model 250 to the set of images as input features. In an embodiment, determining the metric includes determining a level of similarity between at least one of the input features and one or more reference features of an image labeled as indicating proper musculoskeletal form. The reference features may be determined from a subset of images of other users associated with similar physical attributes as the user. Responsive to determining that the level of similarity is less than threshold similarity, the exercise feedback system 100 may classify the musculoskeletal form of the user as improper musculoskeletal form. Additionally, the exercise feedback system 100 may transmit a notification associated with the classification to another client device 110 of a physical trainer of the user.

The exercise feedback system 100 generates 640 feedback for the exercise using at least the metric. The exercise feedback system 100 provides 650 the feedback to the client device 110. The feedback may include a composite view including a visual representation of the user and one or more other graphics. In some embodiments, the exercise feedback system 100 provides the feedback in real-time such that the user can view the feedback via a display of the client device 110 while performing the exercise. Accordingly, the user may be able to adjust performance of the exercise, for example, to avoid injury or improve the musculoskeletal form. In some embodiments, the exercise feedback system 100 determines at least one type of exercise equipment to recommend to the user and provides information describing the exercise equipment as feedback. For example, the exercise feedback system 100 determines a resistance band having a particular amount of tension based on a strength level of the user. As other examples, exercise feedback system 100 can customize recommendations for weights, braces, slings, other medical devices, or other fitness related equipment for users.

ALTERNATIVE EMBODIMENTS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving one or more images captured by a camera of a client device of a user, the one or more images indicating musculoskeletal form of the user while performing an exercise;
    extracting a set of features from the one or more captured images, the extracted features describing the musculoskeletal form of the user;
    accessing a machine learning model that predicts whether the user had proper musculoskeletal form while performing the exercise, the machine learning model trained using features describing a musculoskeletal form in a plurality of images of each of a plurality of other users performing the exercise with and without proper musculoskeletal form;
    determining a metric describing the musculoskeletal form of the user by applying the machine learning model to the extracted set of features from the one or more captured images as input features;
    determining a range of position of at least a portion of a human body performing the exercise based on images of a population of users performing the exercise, where the range of position defines a target correct musculoskeletal form;
    generating feedback for the exercise using at least the metric, the feedback comprising a graphic of the range of position overlaid on an image or video of the user while performing an exercise, where the graphic comprises a boundary indicating that the musculoskeletal form of the user satisfies the target correct musculoskeletal form if within the boundary that represents the range of position; and
    providing the feedback to the client device for presentation to the user.

2. The method of claim 1, wherein determining the metric comprises:
    determining a level of similarity between at least one of the input features and one or more reference features of the at least one of the plurality of images labeled as indicating proper musculoskeletal form, wherein the metric is determined using at least the level of similarity.

3. The method of claim 2, further comprising:
    determining a classification of the musculoskeletal form of the user as improper musculoskeletal form responsive to determining that the level of similarity is less than threshold similarity; and
    transmitting a notification associated with the classification to another client device of a physical trainer of the user.

4. The method of claim 2, wherein the at least one of the input features indicates a range of motion of the user while performing the exercise, and wherein determining the metric comprises:
    determining that the user is fatigued responsive to determining that the range of motion is less than a threshold range.

5. The method of claim 2, wherein the at least one of the input features indicates an amount of time that the user took to perform a repetition of the exercise, and wherein determining the metric comprises:
    determining that the user is fatigued responsive to determining that the amount of time is greater than a threshold time.

6. The method of claim 1, wherein determining the metric comprises:
    determining a physical attribute of the user; and
    determining a subset of the plurality of images indicating musculoskeletal form of the plurality of users associated with users having the physical attribute.

7. The method of claim 6, wherein the physical attribute indicates a value or range of values representing a height or a weight of the user.

8. The method of claim 1, further comprising:
    determining, from the one or more images, an object nearby the user while the user is performing the exercise; and
    determining a position of a portion of a body of the user relative to another position of the object, the metric determined further based on the position of the portion of the body.

9. The method of claim 1, wherein generating the feedback for the exercise comprises:
    determining at least one type of exercise equipment to recommend to the user.

10. A non-transitory computer-readable storage medium storing instructions for image processing, the instructions when executed by a processor causing the processor to:

receive one or more images captured by a camera of a client device of a user, the one or more images indicating musculoskeletal form of the user while performing an exercise;

extract a set of features from the one or more captured images, the extracted features describing the musculoskeletal form of the user;

access a machine learning model that predicts whether the user had proper musculoskeletal form while performing the exercise, the machine learning model trained using features describing a musculoskeletal form in a plurality of images of each of a plurality of other users performing the exercise with and without proper musculoskeletal form;

determine a metric describing the musculoskeletal form of the user by applying the machine learning model to the extracted set of features from the one or more captured images as input features;

determine a range of position of at least a portion of a human body performing the exercise based on images of a population of users performing the exercise, where the range of position defines a target correct musculoskeletal form;

generate feedback for the exercise using at least the metric, the feedback comprising a graphic of the range of position overlaid on an image or video of the user while performing an exercise, where the graphic comprises a boundary indicating that the musculoskeletal form of the user satisfies the target correct musculoskeletal form if within the boundary that represents the range of position; and provide the feedback to the client device for presentation to the user.

11. The non-transitory computer-readable storage medium of claim 10, wherein determining the metric comprises:

determining a level of similarity between at least one of the input features and one or more reference features of the at least one of the plurality of images labeled as indicating proper musculoskeletal form, wherein the metric is determined using at least the level of similarity.

12. The non-transitory computer-readable storage medium of claim 11, the instructions when executed by the processor causing the processor to:

determine a classification of the musculoskeletal form of the user as improper musculoskeletal form responsive to determining that the level of similarity is less than threshold similarity; and transmit a notification associated with the classification to another client device of a physical trainer of the user.

13. The non-transitory computer-readable storage medium of claim 11, wherein the at least one of the input features indicates a range of motion of the user while performing the exercise, and wherein determining the metric comprises:

determining that the user is fatigued responsive to determining that the range of motion is less than a threshold range.

14. The non-transitory computer-readable storage medium of claim 11, wherein the at least one of the input features indicates an amount of time that the user took to perform a repetition of the exercise, and wherein determining the metric comprises:

determining that the user is fatigued responsive to determining that the amount of time is greater than a threshold time.

15. The non-transitory computer-readable storage medium of claim 10, wherein determining the metric comprises:

determining a physical attribute of the user; and determining a subset of the plurality of images indicating musculoskeletal form of the plurality of users associated with users having the physical attribute.

16. The non-transitory computer-readable storage medium of claim 15, wherein the physical attribute indicates a value or range of values representing a height or a weight of the user.

17. The non-transitory computer-readable storage medium of claim 10, the instructions when executed by the processor causing the processor to:

determine, from the one or more images, an object nearby the user while the user is performing the exercise; and determine a position of a portion of a body of the user relative to another position of the object, the metric determined further based on the position of the portion of the body.

18. The non-transitory computer-readable storage medium of claim 10, wherein generating the feedback for the exercise comprises:

determining at least one type of exercise equipment to recommend to the user.

* * * * *